United States Patent Office 3,374,196
Patented Mar. 19, 1968

1

3,374,196
SLOW-DRYING LATEX PAINTS COMPRISING
UREA-POLYOL SOLUTIONS
John A. Gillis, Woburn, and Ronald W. Hayes, Boston, Mass., assignors, by mesne assignments, to Hunt Manufacturing Co., Philadelphia, Pa., a corporation of Pennsylvania
No Drawing. Filed Mar. 27, 1964, Ser. No. 355,452
4 Claims. (Cl. 260—29.6)

This invention relates to a latex coating composition. More particularly it relates to means including an additive for controlling the drying rate of films of latex coating compositions and especially for depressing the rate of skin formation on the exposed surfaces of such films.

Latex coating compositions, i.e. water base liquid coating compositions of the type that contain a polymeric latex as a principal film forming ingredient thereof have become increasingly popular for a variety of uses in recent years. Typically such compositions are used in large volume as paints, liquid "waxes," paper coating, textile sizes and the like.

A principal advantage of such a composition lies in the fact that the continuous phase is water. Thus the viscosity of the composition may be adjusted with water and any utensil coming into contact with the composition may readily be cleaned with water. Once it dries, however, a properly formulated composition can be completely water resistant, and in fact many such compositions are in use as exterior paints.

The drying or film formation of such compositions is a phase reversal phenomenon and occurs primarily because the agglomeration of the individual polymer particles upon the loss of water from the composition either by evaporation or otherwise. Since it is a phase reversal phenomenon drying does not depend upon the complete loss of water but rather upon the reduction of the water content in a portion of the composition affected to below a certain minimum value. This makes drying a local phenomenon and if the water content in any portion of a coating falls below the minimum a coherent film will result. Since the water loss is normally due to evaporation and evaporation normally occurs from the exposed surface, drying or film formation normally occurs first at the exposed surface. Thus during the drying cycle, especially if the coating has any appreciable thickness, a skin of dried composition forms on the surface of the coating while the underneath portion of the coating remains liquid. Since only a minor loss in water may cause film formation drying can occur very rapidly. It should also be pointed out that the phase change from a continuous water phase to a continuous solid phase is a physical reaction which is irreversible at least in its own environment.

Variations of both the liquid characteristics and the dried film characteristics of such compositions over a wide range are well within the ordinary skill of people practiced in the art. Thus by the judicious choice ingredients the dried film may be dull or glossy; transparent or opaque; water resistant or water-, or alkali- or acid-soluble; flexible or brittle; peelable or strongly adherent; etc. Numerous ingredients have been suggested for, and have in fact been used in such compositions. Most such ingredients fall into broad classes including; the vehicle, i.e., a latex or resin emulsion; plasticizers, extenders and softeners for the vehicle; fillers, including pigments; thickening agents; stabilizers including surface active agents; and preservatives; all in almost an infinite variety of particular chemical identity. Suitable vehicles include latices, resin emulsions and dispersions of all sorts, the only basic requirement for suitability being that the vehicle (after the addition of a suitable quantity of a plasticizer if necessary) will form a coherent film upon air drying. At the present

2 time the vinyls (especially vinyl acetate polymer and co-polymer emulsions) the acrylates (especially methyl and ethyl acrylate polymer and co-polymer emulsions) styrene polymer and co-polymer latices and acrylonitrile-butadiene-styrene latices are perhaps the most widely used vehicles in latex coating compositions. The other ingredients of typical latex coating compositions are too numerous to mention. The only basic requirement is that such other ingredients not be water sensitive in the sense that they are destroyed by water since water is the continuous phase in the liquid composition, and such other ingredients are normally introduced into the system as aqueous solutions, emulsions, or dispersions as the case may be.

In a few particular instances the rapid drying characteristics of latex coating compositions have created major problems. Thus while in the present state of the art it is not substantially more difficult to formulate a glossy latex paint for either interior or exterior use than it is a flat paint for such use, such glossy paints unlike the corresponding flat paints have not been generally accepted because of the difficulty in applying them. This difficulty lies in the fact that if there is any appreciable delay between the painting of one portion and the painting of the next the overlap between the two portions will dry to a higher gloss than either of the adjoining portions. This effect occurs when a coherent film has formed in the underneath portion in the overlap before the second portion is applied thereto, and could be avoided if it were possible to depress the rate of drying or a film formation without, of course, interfering with the desired dry film characteristics sufficiently that under normal conditions adjoining panels could be painted in together before either panel had a chance to dry.

A similar difficulty arises if the coating has an appreciable thickness. As mentioned above, skin formation is a normal phenomena in the drying of latex coating compositions. Where the coating is sufficiently thin the rate of diffusion of the water from all portions of the coating is sufficiently rapid that the skin formation phenomena is hardly noticeable. However, if the coating is sufficiently thick a condition may exist for an extended period where the exposed surface has dried to a coherent film while the underneath portion of the coating is still liquid. Under these conditions the coherent film at the surface in the skin can slide or skid over the still liquid underenath portion. Thus even with non-glossy paint it is difficult to paint out drips unless they are noted right away, and difficult to lap adjoining panels where a heavy coating is applied.

We have developed an additive for latex coating compositions that retards the rate of skin formation four to five fold or more without adversely affecting the properties of the dried coating. This degree of retardation and skin formation opens up new areas of use for latex coating compositions. For example, special precautions to avoid overlap need no longer be taken with gloss or semi-gloss latex enamels containing this additive since, under normal painting procedures, the overlap can be painted in before the first applied panel starts to dry.

Of especial interest is the fact that this new additive for the first time permits heavy bodied latex coating compositions which, because of their heavy body, result in thick coatings to be developed for practical brush applications. With the delay in the skin formation adjoining panels of such heavy coatings can be brushed in together and runs and drips and the like may be brushed out before the skin begins to form. Previously the skin formation was so rapid that heavy bodied compositions were practical only for dipping or spray applications and here only where appearance was of little or no importance.

Since it represents the extreme example the nature of the present invention will be disclosed in conjunction with a paste-like latex coating composition having the same rheological properties as conventional artists' oil colors. The consistency of this paste is such that it may be mixed on a palette, may be applied to a canvas with a brush or palette knife, and will maintain sharp edges upon drying. With such material used as an artist's color the time interval between exposure of the composition to air, and the initiation of skin formation becomes extremely critical. Unless there is a reasonable time interval colors can not be mixed either on the palette or on the canvas in the normal manner, and therefore the utility of such a composition as an artist's color is greatly reduced.

The additive has been used with a wide variety of different vehicles in compositions of widely varying characteristics with equivalent results. It would appear that the effect of the additive upon liquid compositions is a physical effect, and is completely independent of the chemical identity of any of the ingredients in that composition. Thus while the invention is explained in conjunction with a particular latex coating composition which represents the extreme case, the results and advantages of the invention are applicable equally to all sorts of latex coating compositions.

The particular additive that we have found to be effective in retarding skin formation of latex coating compounds is a physical mixture of urea and a non-polymeric water soluble polyol, such as glycerin, ethylene glycol or sorbitol. A preferred additive is a mixture of one part by weight of urea and one part by weight of glycerin formed by mixing urea prills into glycerin heated to an elevated temperature between about 230° F. and about 265° F. and preferably about 250° F. until such time as the urea has completely dissolved. Urea in pill form is preferred over urea crystals since the crystals tend to lump and therefore are more difficult to handle.

A typical formulation for a heavy paste-like latex coating composition incorporating this urea-glycerin additive is as follows:

CHROME GREEN

Grind together:

| | |
|---|---|
| Water soluble linseed oil (85%)[1] _____lbs__ | 38 |
| Hydroxy ethyl cellulose (50,000 cps. grade) added as solid _____lbs__ | 7¾ |
| Urea-glycerin additive (1:1 by weight) _____lbs__ | 40 |
| Pigment (chrome oxide green pigment) _____lbs__ | 93 |

[1] Commercially available under the trademark "Linaqua." This material is described by the manufacturer as linseed oil paint vehicle which "contains a volatile coupling agent which evaporates along with the water in the vehicle to leave a thick, continuous film which converts by oxidation to yield a water-insoluble, water-resistant protective coating."

As soon as the ingredients are thoroughly mixed together add:

| | |
|---|---|
| Vehicle[2] _____lbs__ | 310 |
| Fungicide _____ozs__ | 17¾ |
| Antifoam _____ozs__ | 21¼ |
| Water to adjust _____lbs__ | 13½ |

[2] A typical vehicle comprises a mixture of vinyl acetate-dibutyl maleate co-polymer 52% solids, 125 lb. (wet), polyethyl acrylate polymer 46% solids, 185 lb. wet.

It will be noted that the pigment, the thickening agent and the urea-glycerin additive are all first ground into a portion of a drying oil, and that thereafter the vehicle is added to the mixture. By so doing the water in the vehicle comprises essentially the entire portion of water used in making the composition, thereby permitting the production of a composition that has a very high viscosity, a very high plasticity, and a minimum of loss of volume upon drying. The drying oil should either be of a water-soluble variety as shown, or a sufficient portion of a surface active agent of the type promoting oil in water emulsions should be admixed with the drying oil. For example, for a white heavy bodied latex coating composition safflower seed oil might be used instead of water soluble linseed oil. In such instance about 4 lbs. of an emulsifying agent for the oil might be added for every 38 lbs. of oil.

To determine the rate of skin formation a three mil thick film of the latex coating composition was spread on glass and exposed to air. The workability of the film was determined by re-brushing the film. The material was considered workable until such time as there is any discernible picking of the film upon re-brushing. Such picking is the first indication of formation of a surface skin.

Where the urea-glycerin additive is used in a proportion of about 40 lbs. per 150 lbs. of vehicle solids as in the example above workability time as determined by the test described above, is 20 minutes or better in every instance. Without the urea-glycerin additive the workability time of otherwise identical compositions is always five minutes or less.

While the ideal ratio of urea to glycerin in the urea-glycerin additive is about 1 to 1 by weight noticeable increase in workability time occurs where the ratio of urea to glycerin by weight is in the range 1 to 3, to 2 to 1. Below 1 part by weight of urea to 3 parts by weight of glycerin there is no noticeable increase in workability time. Not only are mixtures containing more than two parts by weight of urea for every one part by weight of glycerin difficult to make, but at about this ratio the water susceptibility of the dried film begins to be noticeably adversely affected.

While about 40 pounds of additive per every 150 pounds of vehicle solids appears to be ideal satisfactory results have been obtained using between 20 pounds and 60 pounds per 150 lbs. of vehicle solids. Above 60 pounds of additive the susceptibility of the dried film to moisture is noticeably increased. At less than about 20 pounds of the additive per 150 pounds of vehicle solids there is only a marginal increase in the lengthening of the drying time.

There apparently is some synergistic effect in the combination of urea and glycerin since the increased drying time is not obtained with either ingredient separately. Urea alone tends to destabilize the vehicle causing instability and incipient coagulation. Glycerin alone has no appreciable effect on the drying time. The addition of glycerin alone improves the spreadability of the composition but ultimately as a greater proportion is added the glycerin makes the liquid composition sticky. Other normal humectants such as ethylene glycol, propylene glycol and the like have substantially the same effect as glycerin and do not increase the drying time of the composition as indicated by the period before the first indication of the formation of a surface skin.

No substitute has been found for urea in the additive. However, the glycerin portion of the additive may be replaced by other non-polymeric water soluble polyols, such as ethylene glycol, and sorbitol. The urea-ethylene glycol additive shows some increase in drying time, but not nearly as great an increase as does the urea-glycerin additive. For example, in a composition wherein urea-glycerin additive increase the drying time from about 5 minutes to about 20 minutes an equivalent amount of the urea-ethylene glycol additive only increase the drying time from 5 minutes to about 10 minutes. The urea-sorbitol additive increases the drying time about as much as the urea-glycerin additive. However, the urea-sorbitol additive tends to make the dried film sticky.

We claim:

1. A latex coating composition containing as a drying rate depressing additive between about 20 pounds and about 60 pounds per 150 pounds of latex solids of a solution of urea in a non-polymeric water soluble polyol, the ratio by weight of urea to the water soluble polyol in said solution being between about 1 to 3 and about 2 to 1.

2. A latex coating compound as claimed in claim 1 wherein said polyol is glycerin.

3. A latex coating compound as claimed in claim 1 wherein said polyol is ethylene glycol.

4. A latex coating compound as claimed in claim 1 wherein said polyol is sorbitol.

References Cited

UNITED STATES PATENTS

| | | | |
|---|---|---|---|
| 2,250,346 | 7/1941 | Barrell. | |
| 2,440,953 | 5/1948 | Iliff et al. | |
| 2,683,699 | 7/1954 | Gehring | 260—23.7 |
| 2,802,799 | 8/1957 | Johnson | 260—29.7 |
| 2,813,851 | 11/1957 | McKay | 260—96.5 |
| 2,914,495 | 11/1959 | Gordon et al. | 260—29.6 |
| 3,025,253 | 3/1962 | Mayne et al. | 260—23 |
| 3,033,808 | 5/1962 | Murray et al. | 260—23 |
| 3,037,881 | 6/1962 | McDowell | 260—29.6 |
| 3,085,889 | 4/1963 | Swift | 260—23.7 |
| 3,116,827 | 1/1964 | Gilchrist | 260—29.6 |

DONALD E. CZAJA, *Primary Examiner.*

LEON J. BERCOVITZ, *Examiner.*

R. A. WHITE, *Assistant Examiner.*